N. LOMBARD.
CLUTCHING MECHANISM.
APPLICATION FILED JAN. 19, 1916. RENEWED APR. 26, 1918.

1,270,533.

Patented June 25, 1918.

Witnesses
R. D. Tolman
Penelope Cumberbach

Inventor
Nathaniel Lombard
By Geo. W. Kennedy
Attorney

UNITED STATES PATENT OFFICE.

NATHANIEL LOMBARD, OF WORCESTER, MASSACHUSETTS, ASSIGNOR TO LOMBARD CARBURETOR COMPANY, OF WORCESTER, MASSACHUSETTS, A CORPORATION OF MASSACHUSETTS.

CLUTCHING MECHANISM.

1,270,533.　　　　Specification of Letters Patent.　　Patented June 25, 1918.

Application filed January 19, 1916, Serial No. 73,049. Renewed April 26, 1918. Serial No. 231,023.

*To all whom it may concern:*

Be it known that I, NATHANIEL LOMBARD, a citizen of the United States, residing at Worcester, in the county of Worcester and Commonwealth of Massachusetts, have invented a new and useful Improvement in Clutching Mechanism, of which the following, together with the accompanying drawings, is a specification.

The present invention relates to a clutching mechanism, and resides in the provision of certain means designed to facilitate the operation of devices of this class. The invention contemplates an improved construction whereby relative longitudinal movement between two members of such a mechanism, which are adapted to rotate in unison, is effected with the minimum of friction between said parts, thereby greatly increasing the smoothness of action and the certainty of performance of a clutching device, as hereinafter particularly set forth.

In the accompanying drawings I have illustrated my invention in connection with the well known type of friction or cone clutch commonly used in motor vehicles, to which my improvement is peculiarly applicable; it is to be understood, however, that the showing and description herein are merely illustrative, and that my invention is equally applicable to other types of clutches and power transmitting devices.

In said drawings.

Like reference characters refer to like parts in the different figures.

Figure 3:
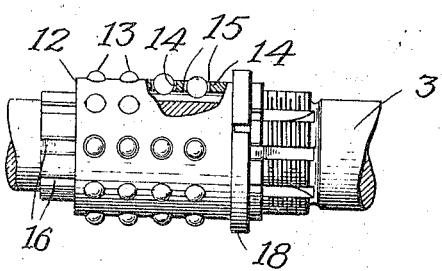
Fig. 3 is a fragmentary view in side elevation of the axially movable parts with which my invention is particularly concerned.

As shown in the drawings the motor vehicle clutching mechanism, which I have chosen for the purpose of illustrating my invention, consists of the usual annular driving member 1, directly connected to the engine shaft 2 and serving as the flywheel for the engine. The driven shaft 3, by which the power is transmitted to the driving wheels of the vehicle in the well known manner, is journaled at its forward end in a bearing 4 provided by the driving member 1, as usually contemplated in devices of this class. The driven shaft 3 carries a longitudinally slidable plate or spider 5 which provides a peripheral friction surface 6 for coöperation with the inner peripheral friction surface 7 of the annular driving member 1. A spring, retained by a fixed collar 9 on the shaft 3, normally maintains the plate 5 at the limit of its forward movement on the shaft 3, thus pressing the surfaces 6 and 7 into close frictional contact and causing the rotation of the driving member 1 to be transmitted through the plate 5 to the driven shaft 3. The plate 5 provides an annular groove 10 for engagement by the usual pedal operated devices, not shown, by means of which said plate may be retracted against the pressure of the spring 8 to disconnect the friction surfaces 6 and 7 and thereby render the clutch inoperative. When these pedal operated devices are released, the spring 8 again becomes effective to slide the plate 5 forward on the shaft and to reestablish the driving connection between the member 1 and the shaft 3, as is usual in devices of this class.

It has been the practice heretofore to provide the shaft 3 with a polygonal section in that length thereof which carries the hub 11 of the plate 5. By similarly shaping the central opening through said hub, the necessary rotation in unison of these two parts has been obtained, and this construction has also afforded the relative longitudinal or axial movement of said hub and plate without permitting relative rotation between said parts. However, it has been found that the above described connection, usually embodied in a square or hexagonal shaft section, gives rise to considerable friction, necessitating the use of a very heavy spring 8 in order to insure the operative connection of the shaft 3 with the motor. Furthermore, it is apparent that with such a polygonal sliding connection between the shaft and the hub 11, the initial engagement of the friction surfaces 6 and 7, particularly when the clutch is being "let in" slowly, exerts an immediate tendency to turn the hub 11 on the shaft; this torsional strain has the effect of greatly increasing the sliding friction between said hub and the squared or hexagonal shaft section, since it forces the corresponding surfaces thereof into close frictional contact, with the application of great pressure.

As a consequence, the further forward movement of the plate 5 to carry the surfaces 6 and 7 into complete engagement is met with considerable resistance; even with the use of a very powerful spring 8, it is not an uncommon occurrence, in the operation of motor vehicles, for this sticking of the hub 11 on the shaft to prevent the complete engagement of the surfaces 6 and 7 and thereby reduce greatly the amount of power transmitted by the clutch. It will be obvious, furthermore, that the necessity for a very powerful spring 8 carries with it a number of disadvantages; the force required to disengage the clutch through the pedal operated devices must be so great as to impose considerable labor on the operator, and, furthermore, it is practically impossible with such a spring to let the clutch in slowly with the proper degree of smoothness.

By my improved construction, there is contemplated a driving connection between the hub 11 and the shaft 3, which will always insure rotation in unison of these parts and, at the same time, permit relative longitudinal movement of said hub with the minimum of friction; furthermore, such a connection as will cause the slight friction between the parts to be reduced, rather than increased, when an initial torsional strain is imparted to the plate 5 and its hub, thereby rendering impossible the sticking of said hub in the manner described above in connection with prior constructions. To this end a sleeve 12 is interposed between the hub 11 and the shaft 3, said sleeve being of slightly less thickness than the annular space between said shaft and the bore of said hub. The sleeve 12 carries a plurality of rows of anti-friction balls 13 extending longitudinally thereof, said balls being preferably arranged and retained in independent sockets 14, which are formed by holes bored through the wall of said sleeve for the insertion of said balls, after which the edges of said holes are upset as at 15, or otherwise flanged inwardly, to prevent the balls from being removed therefrom. The balls 13, as shown, are somewhat greater in diameter than the thickness of said sleeve so that their surfaces project beyond and are exposed on both the inside and outside of the sleeve. The shaft 3 is formed with a plurality of longitudinal grooves 16, corresponding in number to the rows of balls 13, and the side walls of each groove are suitably shaped to provide a seat or raceway for the corresponding row of balls. The bore of the hub 11 provides grooves 17 matching the grooves 16 of the shaft, so that each row of balls is effective with respect to a pair of corresponding raceways formed respectively in the shaft 3 and hub 11.

Figure 1:
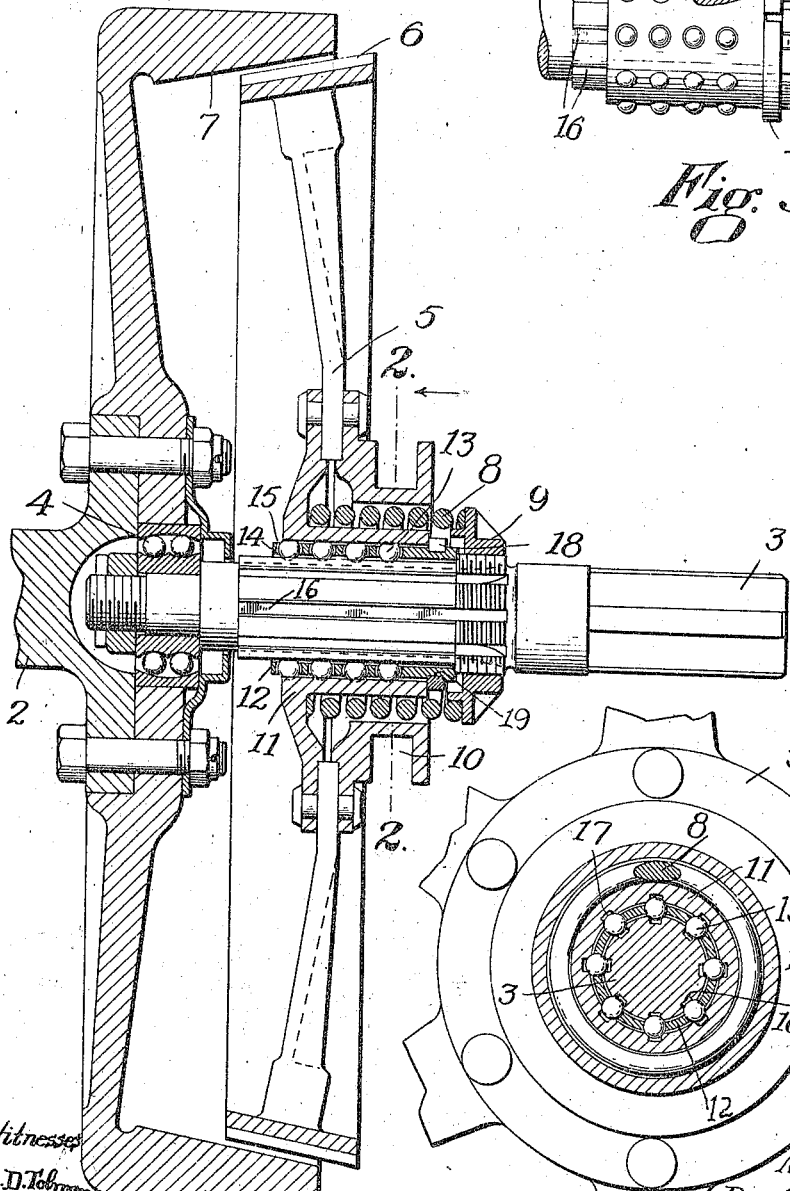
Figure 1 is a vertical sectional view of a clutching mechanism embodying my invention.
Figure 2:
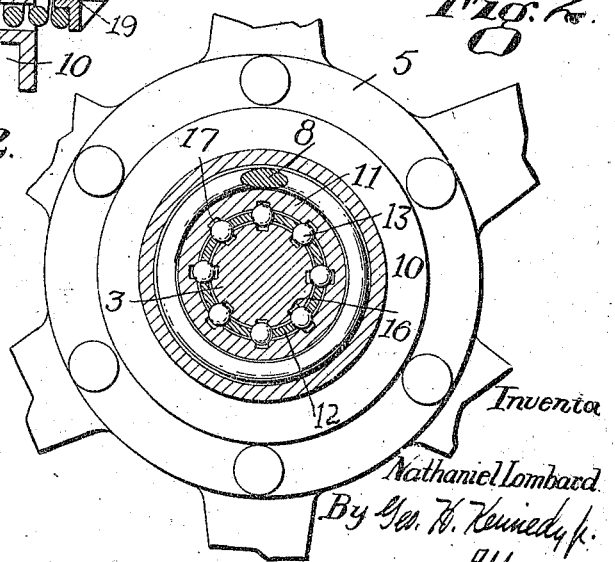
Fig. 2 is a fragmentary section, on the line, 2—2 of Fig. 1.

It will thus be seen that, by the coöperation of the several rows of balls 13 with the grooves 16 and 17 of the shaft and hub respectively, said shaft and hub are securely locked together for rotation in unison, each row of balls, in the relation shown, constituting the equivalent of a key or spline. Furthermore, since each ball is in contact with the shaft 3 and hub 11 at two points only, the effective friction surface, when the plate 5 is moved longitudinally on the shaft, is reduced to a minimum; in fact this friction becomes practically negligible. In the position shown in Fig. 1, the clutch has been disengaged, by retracting the plate 5 against the force of spring 8 in the usual manner. When the spring becomes effective to move the plate 5 forward, the hub 11 of the latter rolls on the balls 13 and said balls, in turn, roll in the grooves 16 of the shaft 3, it being evident that in the absence of slippage between the parts, said hub will travel twice as far as the sleeve 12 which carries the balls. Should any slippage occur between the parts, or should the normal relation existing therebetween be disturbed in any manner, the return of said parts to the exact position illustrated in Fig. 1, when the clutch is disconnected, is insured by means of a stop or abutment 18 on the rear end of the sleeve 12, which is in a position to be engaged by the end of hub 11 when said hub is drawn to the right in Fig. 1. Thus the displacement of the anti-friction element, embodied in the sleeve 12 and balls 13, is effectually prevented, since the retraction of the plate 5 always restores said anti-friction element to its normal position, irrespective of any conditions which may have arisen in the operation of the device to disturb or vary the relative positions of the parts. As shown in Fig. 3, the stop or abutment 18 preferably takes the form of a spring ring, adapted by its contractive force to become seated in a groove 19 formed near the end of sleeve 12. By thus making the stop removable, the other parts of the clutch are enabled to be assembled in the usual manner.

Obviously the spring 8 used in connection with the clutch mechanism above described may be made extremely light. It will be apparent that when the clutch is "let in" slowly, a very smooth action thereof is obtained, owing to the slight friction between the axially movable parts. When a torsional strain is set up in the plate 5 by the initial and incomplete engagement of the friction surfaces 6 and 7, the effective point contact of the balls 13 is practically halved, since all the strain comes on one side thereof. Consequently the slight friction between the shaft 3 and hub 11 as carried by said balls is actually reduced, causing the further forward movement of the plate 5, in carrying the friction surfaces 6 and 7 into complete contact, to be accomplished with the application of even less spring pressure than when such torsional strain had not occurred. Thus it will be seen that a clutch constructed in accordance with my invention is absolutely prevented from sticking, and serves at all times to transmit the full power of the driving shaft since its complete engagement is absolutely insured. It will be obvious also that the results obtained, as stated above, are possible with the use of a much lighter spring than can be employed in the usual constructions.

I claim,

1. In a clutching mechanism, a driving member and a driven member, one of said members comprising two sections adapted for relative movement to render said clutching mechanism operative or inoperative, an anti-friction element disposed for rolling movement relative to both of said sections, when the same are moved relatively to one another, and guiding means on each section for said anti-friction element, said guiding means coöperating with said anti-friction element to constrain the rotation of said sections in unison.

2. In a clutching mechanism, a driving member and a driven member, one of said members comprising a pair of sections capable of relative axial movement, means disposed for rolling movement with respect to both of said sections, when the same are moved relatively, and guiding means on each section for said rolling means, coöperating therewith to constrain the rotation of said sections in unison.

3. In a clutching mechanism, a driving member and a driven member, one of said members being constituted by a pair of relatively movable sections, and an anti-friction means interposed between said sections, said anti-friction means being disposed for rolling movement on one of said sections, and the other section being disposed for rolling movement on said anti-friction means.

4. In a clutching mechanism, a driving member and a driven member, one of said members being constituted by a pair of sections, means for moving one of said sections relatively to the other section, and an anti-friction element disposed for rolling movement relative to both of said sections when the movable section is moved to render the clutching mechanism operative or inoperative.

5. In a clutching mechanism, a driving member and a driven member, one of said members being constituted by a pair of sections, means for moving one of said sections relatively to the other section, an anti-friction element disposed for rolling movement relative to both of said sections when the movable section is moved to render the clutching mechanism operative or inoperative, and means coöperating with said anti-friction element to prevent relative rotational movement between said sections.

6. In mechanism of the character described, a power transmission member comprising a pair of sections rotatable in unison and adapted for relative longitudinal movement, an anti-friction element disposed for rolling movement with respect to both of said sections when the same are moved relatively, and means for limiting the travel of said anti-friction element in one direction.

7. In mechanism of the character described, a power transmission member comprising a longitudinally fixed and a longitudinally movable section, adapted for rotation in unison, anti-friction means interposed between said sections and in longitudinal rolling contact with each, as said movable section is moved, and means for maintaining a predetermined relation between the movement of said anti-friction means and the movement of said movable section.

8. In mechanism of the character described, a power transmission member comprising a longitudinally fixed and a longitudinally movable section, adapted for rotation in unison, anti-friction means interposed between said sections and in longitudinal rolling contact with each, as said movable section is moved, and means for limiting the longitudinal movement of said anti-friction means.

9. In mechanism of the character described, a power transmission member comprising a longitudinally fixed and a longitudinally movable section, adapted for rotation in unison, anti-friction means interposed between said sections and in longitudinal rolling contact with each, as said movable section is moved, and means for insuring the movement of said anti-friction means to a predetermined position, when said movable section is moved in one direction.

10. In mechanism of the character described, a power transmission member comprising a pair of sections rotatable in unison and adapted for relative longitudinal movement, and anti-friction means interposed between said sections and in longitudinal rolling contact with each at a plurality of opposing points, whereby a force tending to produce relative rotation between said sections transfers the friction between said parts to a lesser number of points.

11. In a clutching mechanism, a driving member and a driven member, one of said members comprising telescoping sections capable of relative axial movement to render said clutching mechanism operative or inoperative, said sections having matching longitudinal grooves on their opposing surfaces, and balls interposed between said sections for rolling movement in both of said grooves when relative axial movement between said sections is effected, said balls and grooves coöperating to prevent relative rotational movement between said sections.

12. In a mechanism of the character described, a power transmission member comprising telescoping sections capable of relative axial movement, said sections having matching longitudinal grooves on their opposing surfaces, balls interposed between said sections for rolling movement in the grooves of each section when relative axial movement between said sections is effected, said balls and grooves coöperating to prevent relative rotational movement between said sections, and a ball retaining member interposed between said sections and adapted to hold said balls in spaced relation.

NATHANIEL LOMBARD.

Witnesses:
   PENELOPE COMBERBACH,
   NELLIE WHALEN.